(12) United States Patent
Raczek

(10) Patent No.: US 6,780,447 B2
(45) Date of Patent: Aug. 24, 2004

(54) BACTERIOCIN-CONTAINING SORBIC ACID PRODUCT AS ADDITION TO FEEDSTUFFS IN AGRICULTURAL LIVESTOCK REARING

(75) Inventor: Nico N. Raczek, Kelkheim (DE)

(73) Assignee: Nutrinova Nutrition Specialties & Food Ingredients GmbH, Wiesbaden (DE)

( * ) Notice: Subject to any disclaimer, the term of this patent is extended or adjusted under 35 U.S.C. 154(b) by 131 days.

(21) Appl. No.: 10/080,198

(22) Filed: Feb. 19, 2002

(65) Prior Publication Data

US 2002/0176910 A1 Nov. 28, 2002

(30) Foreign Application Priority Data

Mar. 5, 2001 (DE) .......................................... 101 10 431

(51) Int. Cl.⁷ ................................................. A23K 1/18
(52) U.S. Cl. ................................. 426/61; 2/654; 2/807
(58) Field of Search .............................. 426/61, 2, 654, 426/807

(56) References Cited

FOREIGN PATENT DOCUMENTS

| | | |
|---|---|---|
| CA | 2055984 A1 | 6/1992 |
| DE | 196 08 263 B2 | 9/1997 |
| DE | 196 49 952 A1 | 6/1998 |
| JP | 07-039356 | 2/1995 |
| JP | 08-242831 | 9/1996 |
| SU | 1639574 | 4/1998 |
| WO | WO 93/13793 A1 | 7/1993 |
| WO | WO 98/16124 A1 | 4/1998 |
| WO | 01/54514 A1 | 8/2001 |

OTHER PUBLICATIONS

A. Kermauner et al. "Influence of probiotic addition in different feed mixtures on gastrointestinal tract development and dressing percentage of rabbits" KRMIVA Bd. 38, vol. 2, 1996, pp 87–94.

L.M. Cintas et al., "Isolation and Characterization of Pediocin L50, a New Bacteriocin from *Pediococcus acidilactici* with a Broad Inhibitory Spectrum", Applied and Environmental Microbiology, Jul. 1995, pp. 2643–2648.

E. Rodriguez et al., "Diversity of bacteriocins produced by lactic acid bacteria isolated from raw milk", International Dairy Journal 10 (2000) 7–15.

Aymerich et al., Food Science and Technology International (1998) 4, 141–158.

Parente E. and Ricciardi A., Appl. Microbiol. Biotechnol. 1999, 52, 628–638.

Primary Examiner—C. Sayala
(74) Attorney, Agent, or Firm—ProPat, L.L.C.

(57) ABSTRACT

The present invention relates to a product for use in animal feedstuffs. The product comprises sorbic acid and live or dead microorganisms which secrete bacteriocins, or the bacteriocins themselves or combinations thereof and, where appropriate, a carrier. The invention further relates to the use of the product on its own in feedstuffs or in a mixture with other feed additives for improving the hygienic status of the feed and for improving performance in agricultural livestock rearing.

13 Claims, No Drawings

BACTERIOCIN-CONTAINING SORBIC ACID PRODUCT AS ADDITION TO FEEDSTUFFS IN AGRICULTURAL LIVESTOCK REARING

BACKGROUND OF THE INVENTION

The invention relates to a product which comprises sorbic acid and at least one bacteriocin and can be used on its own in feedstuffs or mixed with other feedstuff additives in agricultural livestock rearing.

Antibiotics are frequently used to improve performance in the animal feed sector. In some cases, very similar or identical substances are used in human medicine. The use of antibiotics in the animal nutrition sector is suspected in principle of being responsible for the dangers derived from resistant bacteria, which may also endanger human health in the long term. It is therefore necessary to look for products about which there are fewer health doubts for this purpose of use. Thus, in other sectors too there is increasing replacement of substances about which there are physiological and epidemiological health doubts or else which are harmful for the environment, such as, for example, antibiotics, formaldehyde-emitting materials, halogenated substances, and many others, by materials about which there are fewer doubts, for example in human foods, feedstuffs, pet food, silages, pomace or other waste materials from the food industry. The purpose of these materials is, on the one hand, aimed at maintaining the value of the actual product. However, on the other hand, it is also intended to improve the hygienic condition thereof and achieve a longer shelf life.

It is known that sorbic acid can be employed for preserving feedstuffs. Sorbic acid (trans,trans-2,4-hexadienoic acid) is a colorless solid compound which dissolves only slightly in cold water and is used around the world as a preservative. The principle of action is determined by sorbic acid in undissociated form. Sorbic acid therefore displays its best effect in the acidic pH range. Sorbic acid and its salts have a very good microbiostatic, antimycotic action. At the same time, as unsaturated fatty acid, sorbic acid is virtually nontoxic, which has been proven by very extensive data and by the decades of use of this acid in the human food sector, in animal feeds, inter alia.

Besides sorbic acid, other organic acids have also been employed for some years for preserving feedstuffs and for improving feed hygiene. The hygienic quality in particular of feed for young animals must meet special requirements. This is why some organic acids are approved without a limitation on the maximum amount, on the basis of the national legal provisions concerning feedstuffs.

Bacteriocins are specific inhibitors which are secreted by microorganisms and are lethal for other microorganisms—principally bacteria. Bacteriocins are peptides, polypeptides, proteins or substances which have at least proteinogenic structures and are composed of amino acids. It is moreover possible for these bacteriocins which are composed of amino acids also to contain unusual amino acids such as, for example, lanthionine or β-methyllanthionine. For example, pediocin L50 contains other modified amino acids (L. M. Cintas et al., "Isolation and Characterization of Pediocin L50, a New Bacteriocin from *Pediococcus acidilactici* with a Broad Inhibitory Spectrum", Applied and Environmental Microbiology, Jul. 1995, pages 2643–2648).

Microorganisms which produce bacteriocin frequently occur naturally, for example in milk and dairy products (cf. for example, E. Rodriguez et al., "Diversity of bacteriocins produced by lactic acid bacteria isolated from raw milk", International Dairy Journal 10 (2000) 7–15). Such microorganisms are moreover continually being isolated from other foodstuffs such as meat and meat products (cf. for example, Food Science and Technology International (1998) 4, 141–158).

The microorganisms which secrete bacteriocins have often already been used for several centuries—often unknowingly—for producing foodstuffs in that the bacteria which are intentionally added as so-called protective cultures inhibit, by their secretion products, other bacteria which cause spoilage, are toxic, unwanted or hazardous in other ways. A well-known bacteriocin is nisin. This is produced commercially and has also been employed for some years as foodstuff additive against certain microorganisms which cause so-called "late blowing" in cheese.

The fundamental disadvantage of using bacteriocins is that they are active only against certain groups of microorganisms, in particular against close relatives. In addition, bacteriocins are unstable in the foodstuff and decompose after a certain time, so that no activity is available any longer.

The other organic acids known as addition to feedstuffs have the disadvantage that some of them are volatile, have unpleasant odors and, in addition, corrosive effects. The performance-improving effects which can be achieved with them are associated with considerable disadvantages in handling.

The object accordingly was to provide a stable addition which is easy to handle, has a preservative effect and improves performance but does not have these disadvantages.

BRIEF DESCRIPTION OF THE INVENTION

This object is achieved by a product (composition) which comprises sorbic acid and at least one bacteriocin. The bacteriocin(s) may be employed as such but it is also perfectly possible to employ live or dead microorganisms which produce or contain these bacteriocins. It is preferred to use bacteriocin-producing microorganisms which occur naturally, for example in dairy or meat products. Microorganisms to be employed according to the invention are only those which produce bacteriocins. The table detailed below contains species of microorganisms which may or may not produce bacteriocins (for example *Bacillus cereus*); these can accordingly be employed only if they produce bacteriocins. The bacteriocin-producing or -containing microorganisms or the bacteriocins themselves can also be employed in encapsulated form or bound to carriers. It is moreover possible to use products which contain bacteriocins in effective concentrations or detectable amounts. This also includes mixtures of such products, for example with whey proteins or common salt. Available products of this type are, for example ALTA2341 (Quest Biotechnology, Inc., Sarasota, U.S.A.) Microgard (Rhône Poulenc, Courbevois, France).

DETAILED DESCRIPTION OF THE INVENTION

The bacteriocins/microorganisms mentioned in the following table are preferably employed.

| Microorganisms | Bacteriocins |
|---|---|
| Aeromonas hydrophila | sakacin A or P |
| Lactobacillus sakei | |
| Bacillus cereus | lactocin-S, lactostrepcin-5, pediocin-A, pediocin-AcH, sakacin-A |
| Bacillus coagulans | nisin |
| Bacillus licheniformis | |
| Bacillus stearothermophilus | |
| Clostridium bifermentans | |
| Lactococcus lactis | |
| Bacillus pumilis | thermophillin |
| Bacillus subtilis, 168, JH642 | subtilin, lacticin-481, nisin, thermophillin, subtilosin |
| Bronchothrix thermospacta | curvacin-A, pediocin-AcH, sakacin-A, sakacin-P |
| Carnobacterium divergens | |
| Carnobacterium piscicola UI 49, LV 17 or LV 61 | carnocin UI 49, carnobacteriocin A, B1 and B2; piscicolin 61 |
| Clostridium botulinum | nisin, pediocin-A, reuterin, sakacin-A |
| Clostridium butyricum | nisin, reuterin |
| Clostridium perfringens | nisin, pediocin-A, pediocin-AcH, pediocin-VTT, reuterin, thermophillin |
| Clostridium sporogens | nisin, pediocin-A |
| Clostridium tyrobutricum | lacticin-481, lactocin-S, pediocin-AcH |
| Enterococcus faecalis | |
| Enterococcus faecalis 226, INIA 4 | enterocin 226NWC, AS-48 |
| Enterococcus faecalis S-48 | bacteriocin Bc-48 |
| Enterococcus faecium, BFE 900, CTC492, cal 1, NIAI157, A, B, P, L 50, G 16, AA13, T136 | enterocin 1146, B, A, Cal, ON- 157, P, L50A, L50B |
| Enterococcus spp. | enterococcins (I-V) |
| Escherichia coli | reuterin, thermophillin |
| Fusobacterium mortiferum, (e.g.: "FM1025") | |
| Lactobacillus acidophilus | lactocicin |
| Lactobacillus acidophilus 11088, OSU 133, 2181, DDS1, LAPT, 1060, M46, N2, TK8912, | lactacin F, lacidin, acidolin, acido-phillin, acidophilucin A, bacteriocin M46, lactacin B, acidocin 8912, lactacin B |
| Lactobacillus amylovorus DCE 471 | amylovorin L471 |
| Lactobacillus bavaricus MI401 | bavaricin A |
| Lactobacillus bulgaricus | bulgarican |
| Lactobacillus brevis | lactobacillin |
| Lactobacillus brevis | brevicin |
| Lactobacillus casei B80 | caseicin 80, caseicin LHS |
| Lactobacillus casei LHS | |
| Lactobacillus curvatus LTH 1174, SB 13 | curvacin A, 13 |
| Lactobacillus delbrückii ssp. bulgaricus | bulgarican |
| Lactobacillus delbrueckii subsp. lactis JCM 1106, JCM 1107, JCM 1248 | lacticin B |
| Lactobacillus fermentum 466 | bacteriocin 446, proteid |
| Lactobacillus gasseri | gassericin A |
| Lactobacillus helveticus | lactocin 27 |
| Lactobacillus helveticus 1829, 481, LP27 | helveticin V-1829, helveticin J, lactocin 27 |
| Lactobacillus plantarum, A2, BN, C-11, LPCO-10, LPCO-10, MI406, NCDO 1193, SIK-83, 35 d, CTC 305, | plantaricin A and D, lactolin, plantar-icin BN, A, S, 406, -B, SIK-83, 35 d |
| Lactobacillus reuteri LA6 | reutericin 6 |
| Lactobacillus sakei, Lb 706, L45, LTH 673, CTC 494, CTC 372, 148 | sakacin-A, lactocin S, sakacin P, sakacin K and T |
| Lactococcus lactis subsp. cremoris, -202, -9B4, -346, -9B4, 4G6, LMG 2130, LMG2081, JW 3 | diplococcin, lactostrepcin 5, lactococcin A, B and M, Bac I, II, III and IV, lactococcin A, G, lacticin |
| Lactococcus lactis subsp. lactis 10, 300, 71, ADRIA 85LO30, CNRZ 481, DRC1, 6F3 | lactostrepcin 1, 2, 3, 4 and DR, lact-icin 481, dricin, bac V, VI and VII |
| Lactococcus lactis subsp. lactis ATCC 11454 | nisin A |
| Lactococcus lactis subsp. lactis | nisin Z |
| NIZO 22186 | |
| Lactococcus lactis subsp. lactis var. diacetylctis 6F7 | bac VIII |
| Lactococcus lactis subsp. lactis var. diacetylctis DPC938, S50 and WM4 | lactocin D, bacteriocin S50, bac WM4 |
| Leuconostoc carnosum e.g.: Lm1 | leucococin Lcm1 |
| Leuconostoc dextranicum | |
| Leuconostoc geldium e.g.: UAL 187 | leucocin A-UAL 187 |
| Leuconostoc gelidium | |
| Leuconostoc mesenteroides | |
| Leuconostoc mesenteroides subsp. mesenteroides FR52, UL5, Y105 | mesenterocin 52, 5, Y105 |
| Leuconostoc paramesenteroides OX | leuconocin S |
| Listeria innocua | lacticin-481, lactosin-S, pediocin-A, pediocin-AcH |
| Listeria ivanovii | pediocin-A, pediocin-AcH, pediocin-PAC10 |
| Listeria monocytogenes spp. | carnobacteriocin A & B, curvacin-A, enterocin-1146, lactacin-B, lacticin-481, leucocin-A, nisin, pediocin-A, pediocin AcH, pediocin-JD, pediocin-PA-1, pediocin-PAC10, pediocin-VVT, piscicolin-61, reuterin, sakacin-A, sakacin-P |
| Listeria seeligeri | pediocin-A |
| Listeria welchii | lacticin-481, pediocin-A |
| Mycobacterium tuberculosis | nisin |
| Pediococcus acidilactic e.a. H, E, F, M | pediocin AcH |
| Pediococcus acidilactic JD1-23, PAC 1.0, SJ-1, | pediocin JD, PA-1, SJ-1 |
| Pediococcus pentosaceus FBB-61, L-7230, N5p | pediocin A, N5p |
| Proteus mirabillis | nisin |
| Pseudomonas aeruginosa | thermophillin |
| Pseudomonas fluorescens | |
| Salmonella enteritidis | reuterin, thermophillin |
| Salmonella infantis | pseudiocin-VVT, reuterin |
| Salmonella typhimurium | reuterin, thermophillin |
| Shigella sp. | reuterin, thermophillin |
| Staphylococcus aureus | nisin, lacticin-481, pediocin-A, pediocin-AcH, plantarcin-SIK83, sakacin-A, thermophillin |
| Staphylococcus carnosus | curvacin, lacticin-481, lactocin-S pediocin-AcH |
| Staphylococcus epidermidis | nisin |
| Staphylococcus simulans | nisin |
| Streptococcus thermophilus Sfi13, St10, STB40, STB78 | thermophillin 13, bacteriocin St10, bacteriocin STB40, bacteriocin STB78 |
| Yersinia enterocolitica | thermophillin |

The bacteriocins are obtained by known processes, for example by simple precipitation using ammonium sulfate, gel filtration (Sephadex G-50), cation exchange chromatography (CM-cellulose), RP-HPLC, adsorption/desorption centrifugation, vortex flow filtration or other technically suitable methods (see Parente E. and Ricciardi A., Appl. Microbiol. Biotechnol. 1999, 52, 628–638).

The product of the invention contains from 90.00 to 99.90% by weight, preferably 95.00 to 99.99% by weight, sorbic acid. Percentages by weight are based in this case on the total weight of the product.

The bacteriocin(s) are expediently present in the product of the invention in amounts such that from 2.5 to 50 mg/kg, preferably 5 to 40 mg/kg, in particular 10 to 20 mg/kg, are present in the animal feed. Preparations which contain bacteriocins are added in appropriately higher dosage (if, for example, the preparation contains 2.5% bacteriocin as active substance, then preferably from 400 to 800 mg/kg thereof are employed). If bacteriocin-producing microorganisms or combinations thereof are employed in the products of the invention, these are preferably present in amounts which correspond to about $10^6$ to $10^{10}$ microorganisms per g of feedstuff. It is also possible to use spray-dried products for this purpose. The bacteriocin content in the animal feed should in this case likewise be from 2.5 to 50 mg/kg, preferably 5 to 40 mg/kg, in particular 10 to 20 mg/kg.

Carriers which can be used both for the sorbic acid and for the bacteriocin or the microorganisms are organic or inorganic materials. These include, for example, starch and other polysaccharides such as cellulose. To improve dispersion in mixtures with sorbic acid, it is also possible for the bacteriocins to be present in the mixtures in salts such as common salt or mineral salts or else whey powder or other products of milk processing.

A further possibility is for the bacteriocins or the microorganisms to be provided with microcapsules/microspheres in order thus to resist unwanted effects of digestive juices. It is possible in this case for the sorbic acid to be put, separate from the bacteriocins, into the microspheres or else into one of the outer layers of a microcapsule in such a way that sorbic acid is released earlier and leads, for example in the stomach, to a marked reduction in pH, but the bacteriocins are not released until later in the gastrointestinal tract. A mixture of encapsulated bacteriocins and sorbic acid is also possible. Examples suitable for the encapsulation are gelatin, lecithins, stearates, alginates, tragacanth, xanthan, carrageenan, cassia gum, gum arabic, maltodextrins, modified starches, celluloses, mono- and diglycerides of edible fatty acids esterified with organic acids or unesterified, solid triglycerides with, preferably, saturated fatty acids such as tripalmitin, solid fatty acids such as palmitic acid or mixtures thereof.

Employed as carrier and for stabilizing the products are >0 to 10% by weight, preferably 2.5 to 7.5% by weight (based on the product), of carrier materials, alone or in combination.

The product of the invention is produced by, for example, mechanical mixing of the sorbic acid and bacteriocins, bacteriocin mixtures, preparations which contain bacteriocins, or live or dead microorganisms which have produced bacteriocins. If the product of the invention comprises a carrier, it is expedient for the microorganism extracts, which are liquid where appropriate, initially to be applied to the carrier, expediently in a commercially available tumbler mixer or other conventional mixer, and then for the sorbic acid and the other solid ingredients to be added.

Examples of suitable animal feedstuffs are green fodder, silages, dried green fodder, roots, tubers, fleshy fruits, grains and seeds, brewer's grains, pomace, brewer's yeast, distillation residues, milling byproducts, byproducts of the production of sugar and starch and oil production and various food wastes. Feedstuffs of these types may be mixed with certain feedstuff additives (e.g. antioxidants) or mixtures of various substances (e.g. mineral mixes, vitamin mixes) for improvement. Specific feedstuffs are also adapted for particular species and their stage of development. This is the case, for example, in piglet rearing. Prestarter and starter feed are used here. The product of the invention can be added to the animal feedstuff directly or else mixed with other feedstuff additives or else be added via premixes to the actual feedstuff. The product can be admixed dry with the feed, be added before further processing (e.g. extrusion) or be metered in and dispersed in the mixture. An additional possibility is to add the individual ingredients of the product separately to individual ingredients of the feedstuff. It is expedient to use for these purposes product concentrations between 0.25 and 7.5% by weight (based on the feed), preferably 0.75 to 4.0% by weight.

The product can be added as sole additive to the animal feedstuffs, for example for cattle, poultry, rabbit or sheep rearing, particularly preferably to prestarter and starter feeds for piglets, or be used mixed with other feed additives for these stock. Feedstuffs having the product of the invention are moreover suitable as milk replacers for the early weaning of lambs or calves.

Surprisingly, the products of the invention do not show the disadvantages described above. On the contrary, the products show good handling properties. In addition, effective acidification of the feed is achieved. It is moreover possible, surprisingly, for there to be a beneficial effect on the growth performance of young stock even with relatively small amounts of product.

The products of the invention are in a solid state of aggregation. The present invention avoids the problems which otherwise arise with the handling of the liquid acids previously used. The product of the invention is also able to improve the hygienic status in that unwanted organisms and spoilage microbes, which may otherwise consume nutrients present, are suppressed.

It has been found, surprisingly, that a marked improvement in performance in relation to growth rate and feed conversion can be achieved by adding even small amounts of products of the invention in piglet rearing. To ensure a significant nutritional activity, it is expedient to add products of the invention in amounts of from 0.25 to 7.5% by weight, based on the feed, preferably from 0.75 to 4.0% by weight.

The invention is illustrated below by means of examples.

EXAMPLE 1

0.0075 to 0.015 kg (corresponding to a concentration of at least 20 mg/kg bacteriocin in the feed) of a product from *Lactococcus lactis* subsp. *cremoris* and *Lactobacillus plantarum*, which has been sprayed with whey powder, dried and enriched with bacteriocins, is mixed with 1.0 kg of sorbic acid in a double cone blender with tumbling movements over a period of about 15 min. The homogeneous mixture is mixed with 100 kg of piglet feed of the following composition (the following data in % by weight).

| | |
|---|---|
| Fish meal | 4.00 |
| Extracted soybean meal | 18.50 |
| Barley | 40.00 |
| Wheat | 33.00 |
| Vegetable oil | 1.90 |
| L-Lysine HCl | 0.2 |
| DL-Methionine | 0.1 |
| L-Threonine | 0.1 |
| Mineral feed | 2.2 |

EXAMPLE 2

0.08 kg of a mixture of nisin (Nisaplin Aplin & Barrett, Dorset, U.K.) with whey proteins and common salt, which contains 2.5 percent of pure substance (equivalent to about $1 \times 10^6$ IU/g or $1 \times 10^6$ Reading units/g), is mixed with 0.92 kg of sorbic acid in a double cone mixer with tumbling movements over a period of about 15 min to achieve a uniform mixture. This mixture is mixed with 100 kg of piglet feed of the following composition (the following data are in % by weight).

| | |
|---|---|
| Extracted soybean meal | 22.00 |
| Barley | 40.00 |
| Wheat | 31.00 |
| Vegetable oil | 2.90 |
| L-Lysine HCl | 0.40 |
| DL-Methionine | 0.10 |
| L-Threonine | 0.10 |
| Mineral feed | 3.50 |

It was found that a marked improvement in performance in relation to growth rate and feed conversion is achieved even by addition of these amounts of products of the invention in piglet rearing.

What is claimed is:

1. A growth promoting product comprising sorbic acid and at least one bacteriocin, wherein the product contains from 90.00 to 99.90% by weight sorbic acid.

2. A product as claimed in claim 1, wherein the concentration of the bacteriocin or bacteriocins is such that from 2.5 to 50 mg/kg of at least one bacteriocin is present in the animal feed in which the product is employed.

3. A product as claimed in claim 1, wherein the bacteriocin or a bacteriocin-producing microorganism is selected from one or more of the following materials:

| Microorganisms | Bacteriocins |
|---|---|
| Aeromonas hydrophila | sakacin A or P |
| Lactobacillus sakei | |
| Bacillus cereus | lactocin-S, lactostrepcin-5, pediocin-A pediocin-AcH, sakacin-A |
| Bacillus coagulans | nisin |
| Bacillus licheniformis | |
| Bacillus stearothermophilus | |
| Clostridium bifermentans | |
| Lactococcus lactis | |
| Bacillus pumilis | thermophillin |
| Bacillus subtilis, 168, JH642 | subtilin, lacticin-481, nisin, thermophillin, subtilosin |
| Bronchothrix thermospacta | curvacin-A, pediocin-AcH, sakacin-A, sakacin-P |
| Carnobacterium divergens | |
| Carnobacterium piscicola UI 49, LV 17 or LV 61 | carnocin UI 49, carnobacteriocin A, B1 and B2; piscicolin 61 |
| Clostridium botulinum | nisin, pediocin-A, reuterin, sakacin-A |
| Clostridium butyricum | nisin, reuterin |
| Clostridium perfringens | nisin, pediocin-A, pediocin-AcH, pediocin-VTT, reuterin, thermophillin |
| Clostridium sporogens | nisin, pediocin-A |
| Clostridium tyrobutricum | lacticin-481, lactocin-S, pediocin-AcH |
| Enterococcus faecalis | |
| Enterococcus faecalis 226, INIA 4 | enterocin 226NWC, AS-48 |
| Enterococcus faecalis S-48 | bacteriocin Bc-48 |
| Enterococcus faecium, BFE 900, CTC492, cal 1, NIAI157, A, B, P, L 50, G 16, AA13, T136 | enterocin 1146, B, A, Cal, ON-157, P, L50A, L50B |
| Enterococcus spp. | enterococcins (I-V) |
| Escherichia coli | reuterin, thermophillin |
| Fusobacterium mortiferum, (e.g.: "FM 1025") | |
| Lactobacillus acidophilus | lactocicin |
| Lactobacillus acidophilus 11088, OSU 133, 2181, DDS1, LAPT, 1060, M46, N2, TK8912 | lactacin F, lacidin, acidolin, acidophillin, acidophilucin A, bacteriocin M46, lactacin B, acidocin 8912, lactacin B |
| Lactobacillus amylovorus DCE 471 | amylovorin L471 |
| Lactobacillus bavaricus MI401 | bavaricin A |
| Lactobacillus bulgaricus | bulgarican |
| Lactobacillus brevis | lactobacillin |
| Lactobacillus brevis | brevicin |
| Lactobacillus casei B80 | caseicin 80, caseicin LHS |
| Lactobacillus casei LHS | |
| Lactobacillus curvatus LTH 1174, SB 13 | curvacin A, 13 |
| Lactobacillus delbrückii ssp. bulgaricus | bulgarican |
| Lactobacillus delbrueckii subsp. lactis JCM 1106, JCM 1107, JCM 1248 | lacticin B |
| Lactobacillus fermentum 466 | bacteriocin 446, proteid |
| Lactobacillus gasseri | gassericin A |
| Lactobacillus helveticus | lactocin 27 |
| Lactobacillus helveticus 1829, 481, LP27 | helveticin V-1829, helveticin J, lactocin 27 |
| Lactobacillus plantarum, A2, BN, C-11, LPCO-10, LPCO-10, MI406, NCDO 1193, SIK-83, 35 d, CTC 305, | plantaricin A and D, lactolin, plantaricin BN, A, S, 406, -B, SIK-83, 35 d |
| Lactobacillus reuteri LA6 | reutericin 6 |
| Lactobacillus sakei Lb 706, L45, LTH 673, CTC 494, CTC 372, 148 | sakacin-A, lactocin S, sakacin P, sakacin K and T |
| Lactococcus lactis subsp. cremoris, -202, -9B4, -346, -9B4, 4G6, LMG 2130, LMG2081, JW 3 | diplococcin, lactostrepcin 5, lactococcin A, B and M, Bac I, II, III and IV, lactococcin A, G, lacticin |
| Lactococcus lactis subsp. lactis 10, 300, 71, ADRIA 85LO30, CNRZ 481, DRC1, 6F3 | lactostrepcin 1, 2, 3, 4 and DR, lacticin 481, dricin, Bac V, VI and VII |
| Lactococcus lactis subsp. lactis ATCC 11454 | nisin A |
| Lactococcus lactis subsp. lactis NIZO 22186 | nisin Z |
| Lactococcus lactis subsp. lactis var. diacetylctis 6F7 | bac VIII |
| Lactococcus lactis subsp. lactis var. diacetylctis DPC938, S50 and WM4 | lactocin D, bacteriocin S50, bac WM4 |
| Leuconostoc carnosum e.g.: Lm1 | leucococin Lcm1 |
| Leuconostoc dextranicum | |
| Leuconostoc geldium e.g.: UAL | leucocin A-UAL 187 |
| Leuconostoc gelidium | |
| Leuconostoc mesenteroides | |
| Leuconostoc mesenteroides subsp. mesenteroides FR52, UL5, Y105 | mesenterocin 52, 5, Y105 |
| Leuconostoc paramesenteroides OX | leuconocin S |
| Listeria innocua | lacticin-481, lactosin-S, pediocin-A, pediocin-AcH |
| Listeria ivanovii | pediocin-A, pediocin-AcH, pediocin-PAC10 |
| Listeria monocytogenes spp. | carnobacteriocin A & B, curvacin-A, enterocin-1146, lactacin-B, lacticin-481, leucocin-A, nisin, pediocin-A, pediocin AcH, pediocin-JD, pediocin-PA-1, pediocin-PAC10, pediocin-VVT, piscicolin-61, reuterin, sakacin-A, sakacin-P |
| Listeria seeligeri | pediocin-A |
| Listeria welchii | lacticin-481, pediocin-A |
| Mycobacterium tuberculosis | nisin |
| Pediococcus acidilactic e.a. H, E, F, M | pediocin AcH |
| Pediococcus acidilactic JD1-23, PAC 1.0, SJ-1, | pediocin JD, PA-1, SJ-1 |
| Pediococcus pentosaceus FBB-61, L-7230, N5p | pediocin A, N5p |
| Proteus mirabillis | nisin |
| Pseudomonas aeruginosa | thermophillin |
| Pseudomonas fluorescens | |
| Salmonella enteritidis | reuterin, thermophillin |
| Salmonella infantis | pseudiocin-VVT, reuterin |
| Salmonella typhimurium | reuterin thermophillin |

| Microorganisms | Bacteriocins |
| --- | --- |
| Shigella sp. | reuterin, thermophillin |
| Staphylococcus aureus | nisin, lacticin-481, pediocin-A, pediocin-AcH, plantarcin-SIK83, sakacin-A, thermophillin |
| Staphylococcus carnosus | curvacin, lacticin-481, lactocin-S, pediocin-AcH |
| Staphylococcus epidermidis | nisin |
| Staphylococcus simulans | nisin |
| Streptococcus thermophilus Sfi13, St10, STB40, STB78 | thermophillin 13, bacteriocin St10, bacteriocin STB40, bacteriocin STB78 |
| Yersinia enterocolitica | thermophillin. |

4. A feedstuff comprising a product as claimed in claim 1.

5. An addition to feedstuffs comprising a product as claimed in claim 1.

6. A feedstuff as claimed in claim 4, comprising from 0.25 to 7.5% by weight, based on the weight of the feedstuff, of the product.

7. A method of making animal feeds or feedstuffs, comprising incorporating a product as claimed in claim 1 into animal feeds or feed stuffs.

8. The method as claimed in claim 7 in pig rearing.

9. The method as claimed in claim 7 in cattle rearing.

10. The method as claimed in claim 7 in lamb rearing.

11. The method as claimed in claim 7 in poultry rearing.

12. The method as claimed in claim 7 in rabbit rearing.

13. A growth promoter comprising sorbic acid and bacteriocin or a bacteriocin-producing microorganism is, said bacteriocin or bacteriocin-producing microorganism consisting of one or more of the following materials:

| Microorganisms | Bacteriocins |
| --- | --- |
| Aeromonas hydrophila | sakacin A or P |
| Lactobacillus sakei | |
| Bacillus cereus | lactocin-S, lactostrepcin-5, sakacin-A |
| Bacillus pumilis | thermophillin |
| Bacillus subtilis, 168, JH642 | subtilin, thermo-phillin, subtilosin |
| Bronchothrix thermospacta | curvacin-A, sakacin-A, sakacin-P |
| Carnobacterium divergens | |
| Carnobacterium piscicola UI 49, LV 17 or LV 61 | carnocin UI 49, carnobacteriocin A B1 and B2; piscicolin 61 |
| Clostridium botulinum | sakacin-A |
| Clostridium perfringens | thermophillin |
| Clostridium tyrobutricum | lactocin-S |
| Enterococcus faecalis | |
| Enterococcus faecalis 226, INIA 4 | enterocin 226NWC, AS-48 |
| Enterococcus faecalis S-48 | bacteriocin Bc-48 |
| Enterococcus faecium, BFE 900, CTC492, cal 1, NIAI157, A, B, P, L 50, G 16, AA13, T136 | enterocin 1146, B, A, Cal, ON-157, P, L50A, L50B |
| Enterococcus spp. | enterococcins (I-V) |
| Escherichia coli | thermophillin |
| Fusobacterium mortiferum, (e.g.: "FM 1025") | |

| Microorganisms | Bacteriocins |
| --- | --- |
| Lactobacillus acidophilus | lactocicin |
| Lactobacillus acidophilus 11088, OSU 133, 2181, DDS1, LAPT, 1060, M46, N2, TK8912 | lactacin F, lacidin, acidolin, acidophillin, acidophilucin A, bacteriocin M46, lactacin B, acidocin 8912, lactacin B |
| Lactobacillus amylovorus DCE 471 | amylovorin L471 |
| Lactobacillus bavaricus MI401 | bavaricin A |
| Lactobacillus bulgaricus | bulgarican |
| Lactobacillus brevis | lactobacillin |
| Lactobacillus brevis | brevicin |
| Lactobacillus casei B80 | caseicin 80, caseicin LHS |
| Lactobacillus casei LHS | |
| Lactobacillus curvatus LTH 1174, SB 13 | curvacin A, 13 |
| Lactobacillus delbrückii ssp. bulgaricus | bulgarican |
| Lactobacillus delbrueckii subsp. lactis JCM 1106, JCM 1107, JCM 1248 | lacticin B |
| Lactobacillus fermentum 466 | bacteriocin 446, proteid |
| Lactobacillus gasseri | gassericin A |
| Lactobacillus helveticus | lactocin 27 |
| Lactobacillus helveticus 1829, 481, LP27 | helveticin V-1829, helveticin J, lactocin 27 |
| Lactobacillus plantarum, A2, BN, C-11, LPCO-10, LPCO-10, MI406, NCDO 1193, SIK-83, 35 d, CTC 305, | plantaricin A and D, lactolin, plantaricin BN, A, S, 406, -B, SIK-83, 35 d |
| Lactobacillus sakei Lb 706, L45, LTH 673, CTC 494, CTC 372, 148 | sakacin-A, lactocin S, sakacin P, sakacin K and T |
| Leuconostoc carnosum e.g.: Lm1 | leucococin Lcm1 |
| Leuconostoc dextranicum | |
| Leuconostoc geldium e.g.: UAL 187 | leucocin A-UAL 187 |
| Leuconostoc gelidium | |
| Leuconostoc mesenteroides | |
| Leuconostoc mesenteroides subsp. mesenteroides FR52, UL5, Y105 | mesenterocin 52, 5, Y105 |
| Leuconostoc paramesenteroides OX | leuconocin S |
| Listeria innocua | lactosin-S |
| Listeria monocytogenes spp. | carnobacteriocin A & B, curvacin-A, enterocin-1146, lactacin-B, leucocin-A piscicolin-61, sakacin-A, sakacin-P |
| Pseudomonas aeruginosa | thermophillin |
| Pseudomonas fluorescens | |
| Salmonella enteritidis | thermophillin |
| Salmonella infantis | pseudiocin-VVT |
| Salmonella typhimurium | thermophillin |
| Shigella sp. | thermophillin |
| Staphylococcus aureus | sakacin-A, thermophillin |
| Staphylococcus carnosus | curvacin, lactocin-S, |
| Streptococcus thermophilus Sfi13, St10, STB40, STB78 | thermophillin 13, bacteriocin St10, bacteriocin STB40, bacteriocin STB78 |
| Yersinia enterocolitica | thermophillin. |

\* \* \* \* \*